Inventor:
Roy R. Allison
By Ahlberg, Hupper & Gradolph
Attorneys.

United States Patent Office 2,788,079
Patented Apr. 9, 1957

2,788,079

MACHINE AND METHOD FOR APPLYING A TEAR STRING OR TAPE TO BOX CARTON BLANKS

Roy R. Allison, Brewster, Kans., assignor to Minnesota Mining and Manufacturing Company, St. Paul, Minn., a corporation of Delaware Application August 2, 1951, Serial No. 240,009

16 Claims. (Cl. 93—1)

The present invention relates to a novel machine and method for applying a tear string or tape to a cut and scored box carton blank made of paper board stock.

It has been proposed at various times to provide box cartons of the paper board or corrugated board types with a tear string or tape which could be pulled to rip through the carton material in order to open the carton along three or four sides or corners so as to open or remove the top. Many of these proposals have had substantial merit, but one of the chief difficulties presented by them is the heretofore impracticability of affixing the tear string or tape to the carton since this must be put on the carton blank after it has been cut and scored and before the blank has been folded into carton form. The present invention is concerned primarily with a new machine and a novel method for affixing a tear string or tape to a cut and scored carton blank, and it is the chief objective of this invention to provide such new machine.

It is a further object of this invention to provide a novel machine and a novel method for applying a tear string or tape to a box carton blank which may be used with any conventional box carton blank manufacturing equipment and which do not need a specially designed carton blank.

It is a further object to provide a new tear string or tape applying machine which is continuous in its operation.

It is a further object to provide a novel machine for affixing a tear string or tape to a box carton blank which automatically accommodates blanks of varying lengths and which may be adapted or adjusted to be used with blanks of varying widths.

Another object is to provide a novel machine for applying a tear string or tape to a box carton blank which affixes the tape to both faces of the carton blank adjacent one end thereof.

It is a further object to provide a novel machine for applying a tear string or tape to a box carton blank which cuts that portion of the tape applied to the blank from the source of tape supply.

Still another object is to provide a novel machine for applying a tear string or tape to a box carton blank which may be stopped and started at will without in any way adversely affecting the operation of the machine.

Still another object is to provide a tear string or tape applying machine which uses a novel device for coating a flat tape preferably of the woven type with adhesive in a manner so as not to drip adhesive even though the tape be held stationary in the applicator for several hours.

It is still another object to provide a novel machine for affixing a tear string or tape to a box carton blank which is simple in its operation and has no critical adjustments which must be constantly maintained.

Another object is to provide a machine of this class which is simple in its construction and economical to manufacture.

A further object is to provide a novel method of applying a tear tape or the like to an otherwise completed carton blank which is continuous.

A further object is to provide a novel method of applying a tear tape or the like to an otherwise completed carton blank which applies the tape simultaneously to both sides of the blank adjacent one end thereof, then applies the tape to the remaining length of one face, and finally cuts the tape from the source of supply.

Other objects and advantages will become apparent from the following description taken in conjunction with the accompanying drawings in which.

Figures 4, 17, 18:
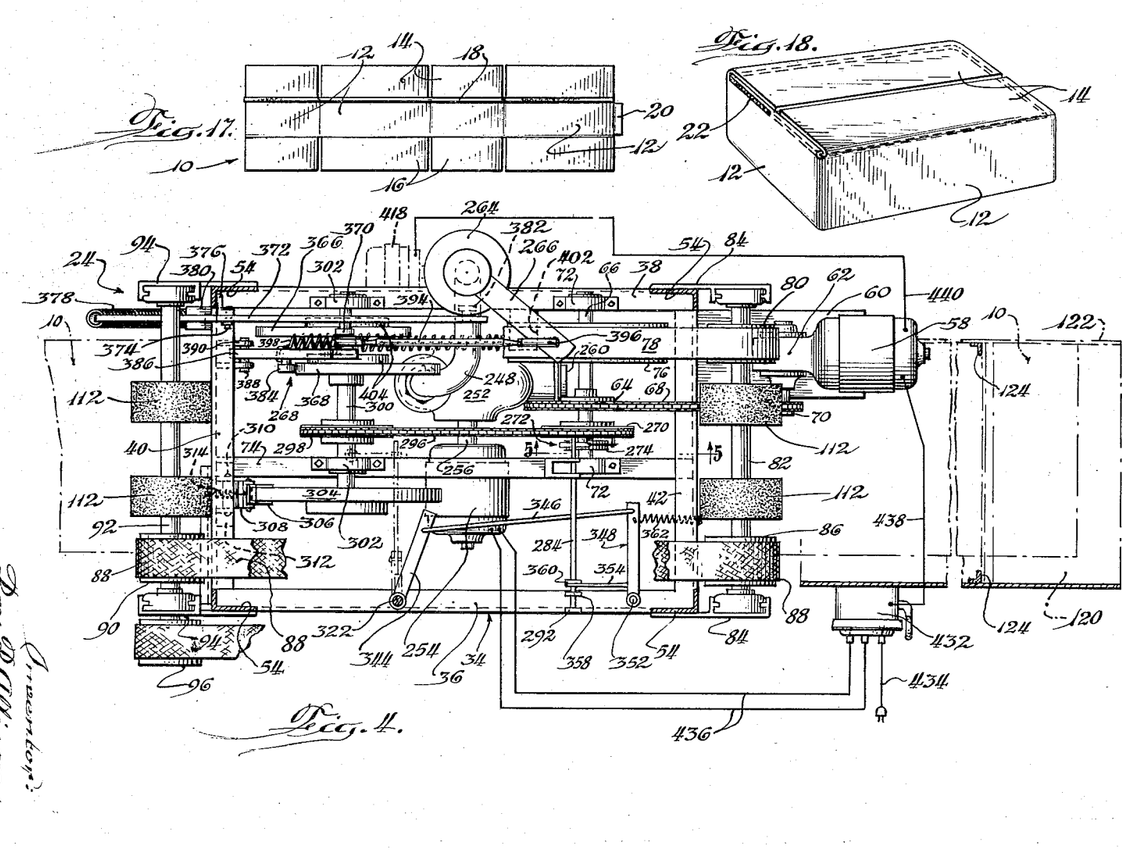
Fig. 4 is a horizontal sectional view taken substantially along the line 4—4 of Fig. 1.
Fig. 17 is a small plan view illustrating a carton blank with the tape applied thereto.
Fig. 18 is a small perspective view of a completed and sealed carton before being opened.

Referring first to Figs. 17 and 18, which illustrate a box carton blank having a tear string or tape applied thereto and a sealed box carton, the reference character 10 indicates a paperboard or corrugated board carton blank cut and scored to provide side wall portions 12, top flaps 14 and bottom flaps 16. In the score line between the side wall portions 12 and the top flaps 14 is a tear string or tape 18 which is secured to the carton blank by a suitable adhesive, such as a rubber base adhesive of well known type. At one end, namely the trailing end of the blank, the side wall portion 12 is provided with a short extension or flap 20 which when the blank is folded to the form shown in Fig. 18 is tucked inside the carton and stapled or glued to form a corner. At the opposite or leading end of the blank the tape 18 is glued to the outside face of the blank forming a tape portion 22 which when it is desired that the carton be opened is pulled loose to provide a handle to be gripped by the person opening the carton. It is, of course, clear that the tear string or tape is pulled outwardly along three or four edges of the carton to give a hinged lid or completely to remove the top.

The carton blank 10 may be manufactured of any suitable carton material. Preferably it is of a paperboard stock and in many cases is made of corrugated board with the corrugations running the short way of the carton, namely, top to bottom as seen in Fig. 17. In all respects the carton blank 10, with the exception of the tear string 18, is identical with any carton blank which is now manufactured on a conventional box manufacturing machine.

The tear string 18 is applied to a carton blank 10 by the novel machine of the present invention which is indicated generally by the reference character 24, which machine is designed to carry out the novel method.

The machine 24 has a frame 26 comprised of four vertical corner posts 28, and a suitable horizontal frame 30 adjacent the bottom of the corner posts 28. The corner posts 28 support an upper frame part 32 which is comprised of a horizontally disposed frame 34 made of channel members 36, 38, 40 and 42, and an upper horizontal frame part 44 similarly made of channel members 46, 48, 50 and 52. The two horizontal frame parts 34 and 44 are interconnected by vertical corner posts 54. All of the frame elements are rigidly interconnected preferably by welding, and the upper frame 32 is additionally supported from the corner legs 28 by diagonal bracing members 56.

The machine 24 is provided with a main driving motor 58, mounted upon bracket 60, which drives a small gear 70 through a gear reduction box 62. The bracket 60 is welded or otherwise rigidly mounted upon the frame of the machine. A large main gear 64 keyed to a shaft 66 is driven by the gear 70 through a chain 68 passing over the gears 70 and 64. The shaft 66 is journaled in a pair of bearings 72 one of which is mounted on the frame member 38 and the other of which is mounted on a longitudinal frame member 74 which is carried by and preferably welded to the frame members 40 and 42.

A large pulley 76, also keyed to the shaft 66, drives a flat belt 78, which passes over and drives a smaller pulley 80 fixed on or keyed to a shaft 82 journaled at the inlet end of the machine in bearings mounted in bracket plates 84 welded to the corner uprights 54 at either side of the machine. A second pulley 86 similarly keyed to the shaft 82 drives a belt 88 which passes over driven pulley 90 of the same size fixed on a shaft 92 at the outlet end of the machine. The shaft 92 is journaled in suitable bearings carried in bearing plates 94 which are welded to the uprights 54 at the outlet end of the machine. A driving pulley 96 keyed to the shaft 92 drives a belt 98 which passes over a driven pulley 100 secured on a shaft 102 which is directly above the inlet end shaft 82. A driving pulley 104 is keyed to the shaft 102 and drives a belt 106 which passes over a driven pulley 108 keyed to shaft 110 carried in bearings supported by the bracket plates 94 at the outlet of the machine. Shaft 110 is parallel to and directly above the shaft 92. It will be observed that all of the pulleys mounted on the shaft 82, 92, 102 and 110 are of the same size so that these shafts are all driven at the same rotational speed. These shafts carry pairs of rubber surfaced rollers 112 between which the box carton blanks 10 are fed to carry them through the machine. At least the upper pairs of bearings mounted in the brackets 84 and 94 are adjustable vertically so that the proper spacing between the pairs of rollers 112 can be effected to insure that rollers 112 firmly grip and properly feed the carton blanks 10. The belt 106 has its lower run raised by passing it over an idler pulley 114 journaled on a shaft 116 carried in supports 118 secured to the frame. The reason for raising this run of the belt 106 will appear more fully hereinafter.

Figure 7:
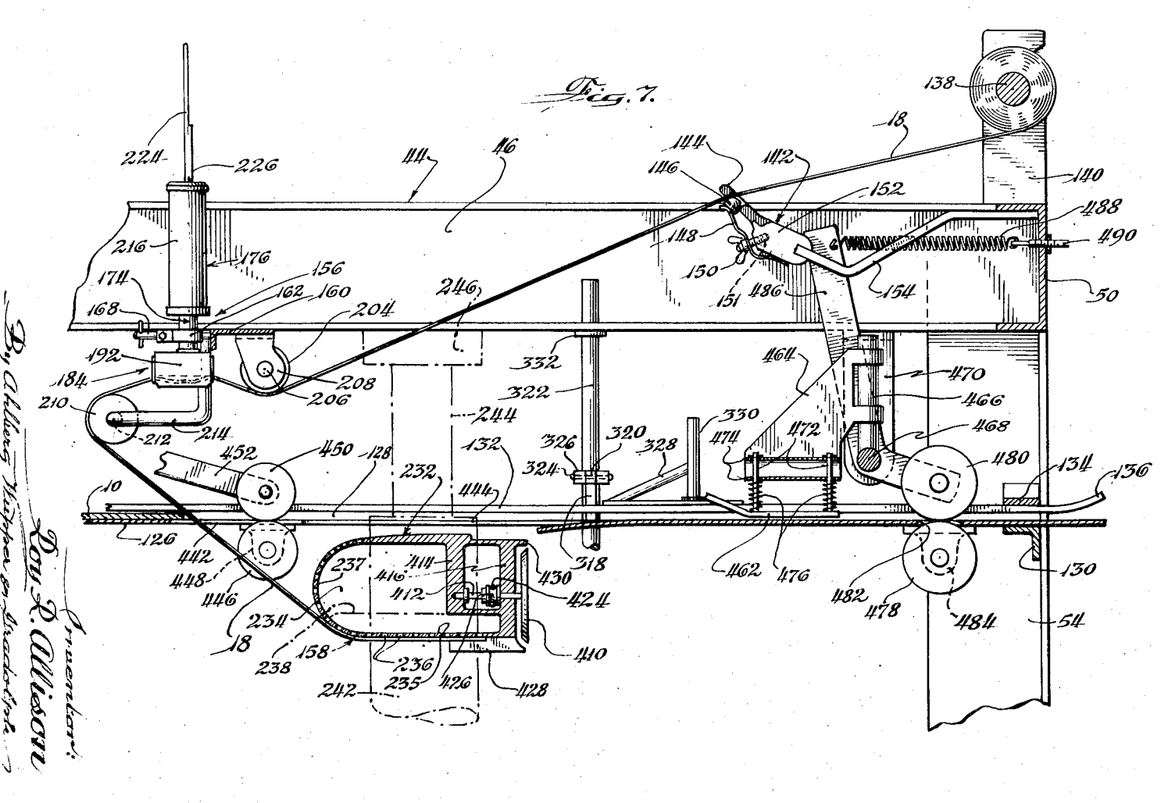
Fig. 7 is an enlarged cross-sectional view illustrating the tape feed and the adhesive applicator and may be considered as taken along the line 7—7 of Fig. 3 looking in the direction of the arrows.
Figures 8, 9, 10:
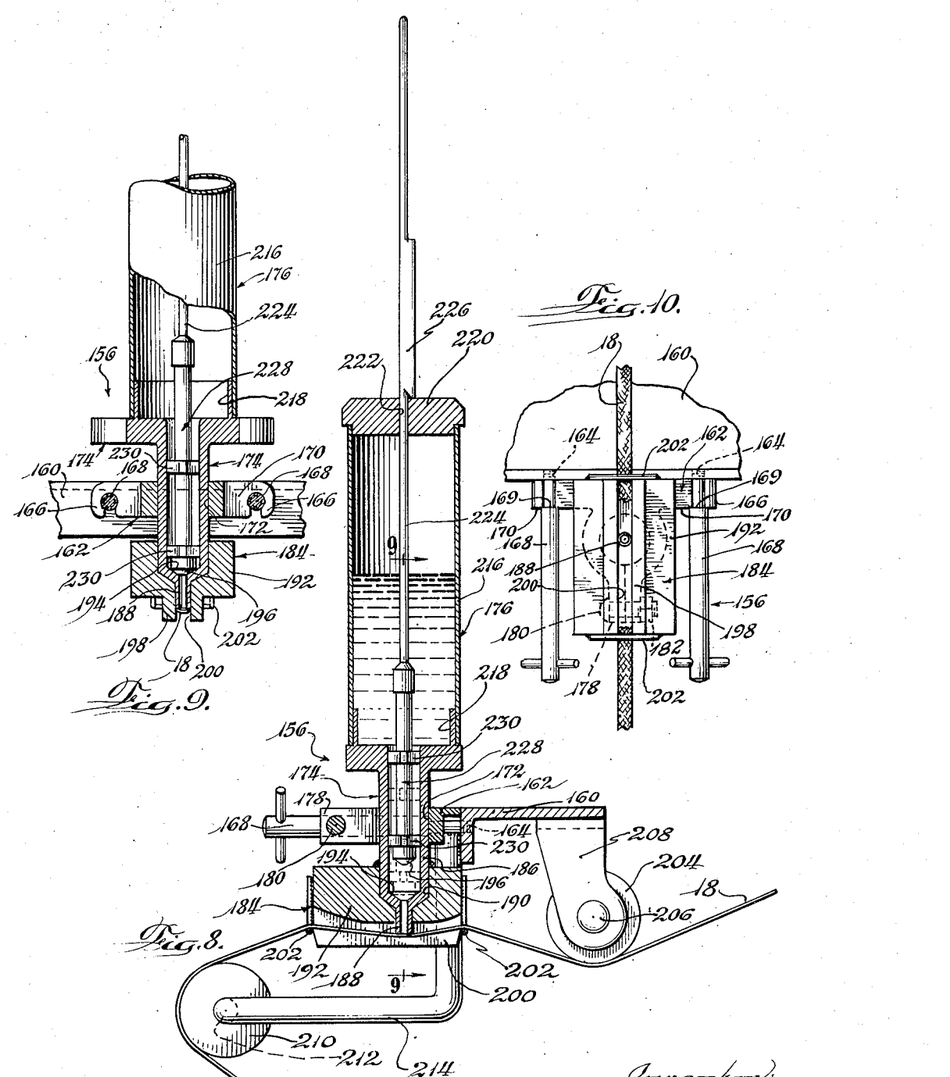
Fig. 8 is a greatly enlarged detail cross-sectional view taken through the adhesive reservoir and applicator and may be considered as taken along the line 8—8 of Fig. 3 looking in the direction of the arrows.
Fig. 9 is a fragmentary cross-sectional view taken along the line 9—9 of Fig. 8, looking in the direction of the arrows, to show a portion of the means for mounting the adhesive applicator to the machine frame.
Fig. 10 is a bottom plan view of the adhesive applicator.
Figure 11:
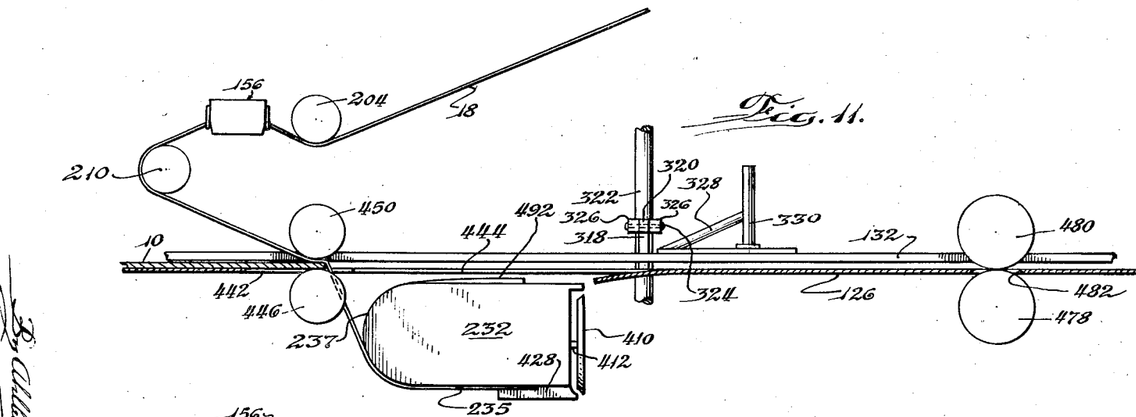
Figs. 11 to 16 are diagrammatic views showing the progress of a box carton blank through the machine and the steps involved in applying the tape to the carton blank and in shearing the applied tape portion from the supply source.

In the particular form of the machine illustrated in the drawings, the box carton blanks 10 are fed from a table 120 having a raised back portion 122 and supported on legs 124. The table 120 is of a height so that the carton blanks, when slid therealong either manually or mechanically, will pass between the inlet feed rolls 112. The carton blanks as they move through the machine are supported on a table 126 (Fig. 7) provided with side guide rails 128 formed of angle bar stock. The clear space across the table 126 between the guide rails 128 is equal to the width of the widest carton blank with which this machine is designed to be used. This width may be narrowed by fastening or positioning side guide blocks or strips (not shown) on the inner faces of the rails 128 thereby to accommodate narrow cartons. It is preferable that the machine be designed for the widest carton blank so as to insure flexibility in adaptability for other and various sizes of blanks. The rails 128 and the table 126 are supported between the uprights 54 by suitable supporting cross brace members 130 (Fig. 7).

At approximately the center of the table, and running the full length thereof, is a holding down guide 132 which is spaced from the table surface a distance slightly greater than the thickness of a box carton blank. The guide 132 is supported from a pair of transverse members 134 which may be welded to the guide and to the corner posts 54. It will be observed from the drawings that the inner and outlet ends of the guide 132 are turned up at 136 to prevent accidentally catching a carton blank thereon.

The tape 18—which is preferably a flat woven tape—is fed from a spool 138 upon which it is wound by the tape manufacturer. This spool is removably journaled in diagonal slots 139 in upright brackets 140 mounted on the upper face of the frame member 50. Tape 18 is fed from the spool through a tension regulating device 142 to prevent overrunning of the spool and also to insure that the tape is always fed in one position, and if perchance the tape has been turned over when the spool 138 is wound, the tension regulating mechanism will right it before passing it. The tension adjusting mechanism 142 (Fig. 7) includes a ring 144 through which the tape passes. A button 146 having a convex outer surface is held in full floating position in the ring opening by a leaf spring 148 the tension of which is adjusted by a wing nut 150 threaded on a stud 151. The ring 144 is preferably cast integrally with a support body 152 into which the stud 151 is threaded and to which the leaf spring 148 is anchored, and the whole assembly is mounted upon a bracket 154 secured as by welding to the frame member 50.

From the tension adjusting device 142 the tape 18 passes to and through an adhesive applicator 156 and to the device 158 for holding the free end of the tape immediately before it is contacted with a carton blank so that it may be adhered to both sides of the blank at the entering end thereof.

The adhesive applicator 156 (Figs. 7 to 10) is mounted upon a transverse angle member 160 welded to the side rails 46 and 48 of the horizontal frame 44. The applicator assembly includes a support 162 removably secured to the frame member by a pair of locking bolts 168 having tapped ends 164 extending through slotted ends 166 of the support and threaded into the member 160. In locking position the bolts 168 have annular shoulders 169 engaging against flat faces 170 of the support 162 to hold the applicator in position. The support 162 has a central circular opening 172 through which projects the base 174 of reservoir 176. At a point diametrically opposite the frame member 160 the support 162 is split to provide a pair of ears 178 which are locked together by a bolt 180 and nut 182 so as firmly to grip the base 174. This arrangement permits vertical adjustment of the reservoir 176 in the support 162, and it may be rotated about its vertical axis as required.

A glue applicator head indicated generally by the reference character 184 is welded to the lower end of the base 174 and fits over a downwardly extending tubular portion 186 terminating in a second tubular portion 188 of substantially reduced diameter. The portion 186 extends into and the portion 188 projects through and from a counterbored passage 190 in block 192 forming the major portion of the applicator head 184. The tubular portions 186 and 188 are in communication with the interior of the reservoir 176 and a valve seat 194 is formed at the junction therebetween. A valve 196, the construction of which will be described hereinafter, seals against the seat 194. At its lower face the block 192 is formed with a pair of longitudinally extending tape guides 198 defining a slot 200 therebetween. Preferably the slot is slightly narrower than the width of the tape which is to be applied to the carton blanks. It is obvious, of course, that any width tape can be used and that for wider tapes a head 184 having a wider slot would be substituted and vice versa. It will be observed from Figs. 9 and 10 that the tubular portion 188 projects slightly into the tape slot 200 and its outside diameter is exactly the same as the slot width. These dimensions are important because the tape when passing the mouth of the tube 188 should close it to prevent a leaking flow of adhesive therearound. This arrangement insures that a proper quantity of adhesive is applied to the tape, and if it should become necessary at any time during the operation of the machine to stop the tape feed the stationary tape acts as a shutoff valve.

The head 184 is fitted with a pair of U-shaped wire stirrups 202 which are mounted higher than the mouth of the tube 188. The tape 18, after passing from the tension regulating device 142 passes beneath a roller or pulley 204 journaled on a shaft 206 in a bracket 208 welded or otherwise permanently secured to the transverse support 160. The lower tangential part of the roller or pulley 204 is lower than the applicator head 184 and consequently lower than the first stirrup 202. Therefore, the tape 18 must pass below the roller or pulley 204 up over the stirrup 202 under the end of the tubular part 188 and over the next stirrup 202. A direction reversing pulley 210 is rotatable on a shaft 212 forming part of a zigzag bracket 214 having an upright part welded to the transverse frame member 160. The pulley 210 is generally below the head 184 and assists in maintaining a proper tension on the tape so that it contacts the end of the tube 188 in the proper adhesive collecting and drip preventing position.

The reservoir 176 includes a tubular shell 216 having its lower end secured around an upstanding flange 218 on the base 174. If the fit between the shell 216 and the flange 218 is liquidtight, these two parts need not be welded together or otherwise permanently fastened. At its upper end the shell 216 is closed by a removable cap 220 having an opening 222 therein through which a valve stem 224 projects. The opening 222 is oblong or oval so as to permit passage of a longitudinally extending stop 226 secured along one side of the valve stem 224. At its lower end the valve stem is connected to a valve body 228 which has the valve 196 formed on its lower end; the valve body is provided at intermediate points with star shaped guides 230 which slidably engage the walls of the tubular portion 186.

It will be observed from Fig. 7 that the adhesive is supplied to the upper face of the tape 18 as its passes through the applicator 156. After the tape has passed over the direction reversing pulley 210 the face to which the adhesive has been applied is the lower face, but at no time does the coated face of the tape come into contact with any part of the machine and consequently none of the adhesive will be scraped or brushed off and a completely and properly coated tape will be presented for application to the box carton.

The suction device 158 will be described with particular reference to Figs. 1, 2, 3, 4 and 7 and includes a suction head 232 comprising a housing 234 having a plurality of orifices 236 arranged in a straight line around the bottom 235 and curved end 237 thereof. The housing 234 is carried at the open inlet side of a cone shaped conduit 238 to which it is secured as by welding or soldering. The cone shaped conduit 238 is connected by a suitable fitting 240 to a sleeve conduit 242 which is rotatably and vertically slidable upon a fixed conduit 244 which has its upper end capped at 246. The pipe or conduit 244 is in turn connected to a flexible conduit 248 leading to the inlet 250 of a blower 252. When the machine is operating the blower is driven continuously by a motor 254 through a shaft 256. The motor 252 is mounted on a bracket 258 depending from the longitudinal frame member 74. The exhaust end 260 of the blower is turned in such direction as not to be inconvenient or blow upon the attendants. The sleeve conduit 242 slides in substantially airtight relation on the conduit 244 but at all times has its interior in communication with the interior of the conduit 244 by means of the opening 262 in conduit 244. The upper and lower end of the movable sleeve conduit 242 is provided with suitable packings so that there will be substantially no leakage of air thereinto to break the suction developed in the suction head 232.

At its lower end the sleeve 242 is provided with a circular flange 264 having an arm 266 extending radially outwardly therefrom as best seen in Fig. 4. The sleeve 242 and the suction head which is carried thereby are moved up and down and oscillated through an arc of 90° by a mechanism 268 operatively connected to the arm 266 and the flange 264.

Figure 5:
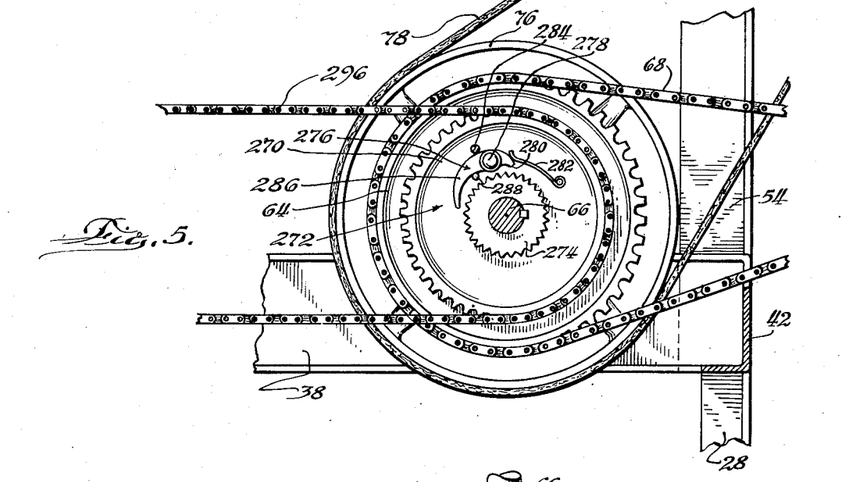
Fig. 5 is an enlarged detail view of a portion of the drive, and in particular of the dog clutch, and may be considered as taken substantially along the line 5—5 of Fig. 4 looking in the direction of the arrows.
Figure 6:
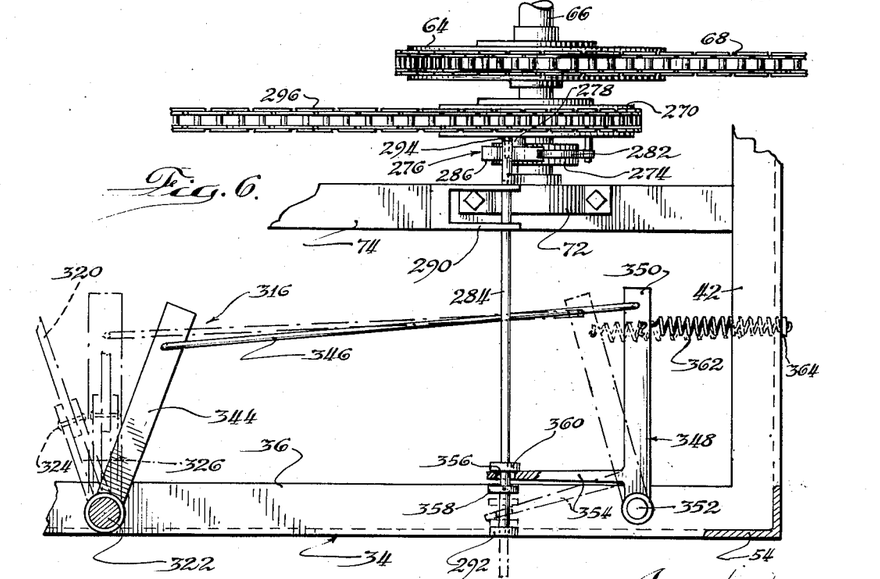
Fig. 6 is an enlarged detail plan view of a portion of the drive and the linkage for operating the dog clutch and may be considered as being taken substantially along the line 6—6 of Fig. 1 looking in the direction of the arrows.

The suction head oscillating and vertically reciprocating mechanism is driven from the main drive shaft 66 through a gear 270 freely rotatable on the shaft 66 (Figs. 5 and 6). The gear 270 is connected for driving relationship to the shaft 66 by a dog clutch 272 which comprises a ratchet wheel 274 keyed to the shaft 66 and a pawl 276 pivoted at 278 on the face of the gear 270. The nose 280 of the pawl 276 is biased toward ratchet tooth engaging position by a leaf spring 282 fixed to the gear 270. The pawl 276 is disengaged from the ratchet teeth by a longitudinally reciprocable rod 284 contacting the leading end 286 of the pawl as it rotates in a counterclockwise direction. Stop pin 288 in the gear 270 limits the pivotal movement of the pawl in the counterclockwise direction to prevent jamming the clutch.

The longitudinal rod 284 is slidably mounted in a bracket 290 secured to the longitudinal support 74 and in a bracket 292 carried on the frame member 36. At its inner end the rod 284 is provided with a spring pressed tip 294 which rides lightly against the face of the gear 270. As the rod 284 is pulled outwardly (in a manner to be described) from the face of the gear 270 it releases the pawl 276 and the spring 282 depresses the nose 280 thereof into engagement with one tooth of the ratchet wheel 274. The continuously rotating ratchet wheel drives the gear 270 in the counterclockwise direction for one revolution, at which time the rod 284, having been released and returned to initial position as shown in Figs. 5 and 6, is struck by leading end 286 of the pawl which pivots against the stop 288 to lift the nose 280 out of engagement with the ratchet wheel 274, and the rotation of the gear 270 is thereby terminated.

The gear 270 drives a sprocket chain 296 which in turn drives a gear wheel 298 keyed to shaft 300. The shaft 300 is journaled in a pair of pillow block bearings 302 mounted on the frame members 38 and 74 in the same manner as the bearings 72. At one end of the shaft 300 is a flywheel 304 against the circumferential rim of which there is contacted a brake shoe 306. The brake shoe is arranged to bear constantly against the flywheel 304 by an L-shaped lever 308 pivoted at 310 in a bracket 312 fixed to the frame, and pivoted to the shoe. A tension spring 314 determines the pressure with which the brakeshoe 306 rides against the flywheel 304. This brake prevents excessive overrunning of the dog clutch drive 272 and those parts of the machine which are driven from or mounted on the shaft 300. Therefore, when the dog clutch is disengaged the gear 270 stops substantially immediately and the disengagement may be timed to compensate for the very slight overrunning of the drive.

The dog clutch is disengaged, as previously noted, by placing the end of the rod 284 in the path of the pawl 276 as the gear wheel 270 rotates in a counterclockwise direction (Figs. 5 and 6). The clutch is engaged by withdrawing the rod 284 from the face of the gear 270 through a linkage 316 which is actuated by a carton blank 10 as it travels across the table 126.

The linkage 316 is shown most clearly in Figs. 1, 3, 4, 6 and 7. The moving carton blank 10 contacts its leading edge against the depending foot 318 (Fig. 7) of a bar 320 which extends transversely across the table at an appreciable distance thereabove but under the raised lower run of the belt 106. The foot 318, however, rests on the surface of the table to place it in the path of movement of the carton blanks. The advancing carton blank moves the foot 318 forwardly to effect horizontal pivotal movement of the transverse bar 320 about the axis of a vertically extending shaft 322 to which the transverse bar is secured for vertical pivotal movement by a pin 324 extending horizontally through a fitting 326 that is fixed to the shaft 322. The foot 318 is lifted out of the path of movement of the carton blank 10 by the vertical movement of the transverse bar 320 as it slides up the inclined surface of a guide bar 328 mounted on the upper surface of the holding down guide 132. The guide 328 raises the rod 320 sufficiently to lift the foot 318 above the carton to allow the carton to travel thereunder. Counterclockwise rotation of the transverse rod 320 (Fig. 3) is limited by a vertically positioned stop 330. The vertical shaft 322 is mounted for oscillation about its axis in a pair of bearings 332 secured in the frame members 36 and 46.

Figure 3:
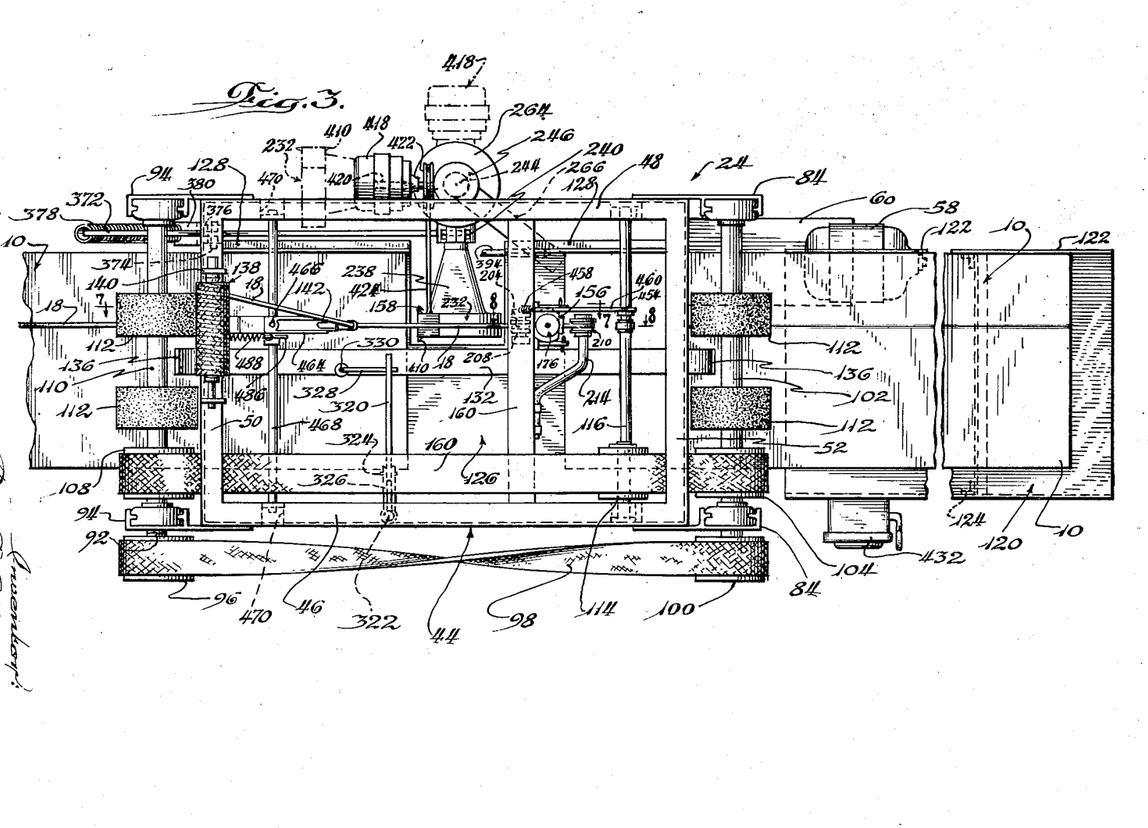
Fig. 3 is a top plan view.

Adjacent the lower end of the shaft 322 is secured one end of a lever 344. Adjacent its outer end the lever 344 is connected to a stiff wire link 346 which has its opposite end secured to the outer end of arm 350 of a bellcrank lever 348 pivoted at 352 in the frame member 36. Arm 354 of the bellcrank 348 is apertured at 356 slidably to receive the rod 284. The arm 354 is confined between a pair of adjustable stops 358 and 360 on the rod 284; when the arm 354 moves against the stop 358 the arm 284 is withdrawn to allow the dog clutch 272 to engage and when against the stop 360 it forces the arm 284 toward the gear 270. The bellcrank lever 348 is biased in a clockwise direction by a spring 362 interconnecting arm 350 and lug 364 on the frame member 42. Thus as the box carton 10 moves through the machine its leading edge contacts the foot 318 on the transverse bar 320 to pivot it and the vertical rod 322 in counterclockwise direction (Fig. 3). The linkage 344, 346 and 348 transmits this movement to the rod 284 removing the latter from the dog clutch to allow it to engage and energize the drive between the shaft 66 and the shaft 300. As soon as the foot 318 has cleared the leading edge of the carton the spring 362 restores all of the trip mechanism parts to their original position.

A pair of cams 366 and 368 are keyed to the countershaft 300 and are rotatable therewith. The cam 366 will be referred to hereinafter as the "lifting cam," and the cam 368 will be referred to as the "oscillating cam," because these two cams lift and oscillate, respectively, the suction head 232 and its associated mechanism. The lifting cam 366 has its cam surface engaged by a follower roller 370 journaled on a lever 372 intermediate the ends thereof. The lever extends generally longitudinally of the machine and is pivoted at 374 to the adjacent frame upright 54 on a bracket structure 376. The outer end of the lever 372 is connected by a tension spring 378 extending generally downwardly to a bracket 380 near the foot of the upright 28. At its inner end the lever 372 is provided with a roller 382 which is biased by the spring 378 to ride against the under side of the circular disc 264 secured to the lower end of the sleeve conduit 242. As the lifting cam 366 is rotated by the shaft 300, the cam follower roller 370, located between the pivot 374 and the roller 382, is raised and lowered to rock the lever 372 about the pivot 374, thereby to raise and lower the sleeve conduit 342, the suction head 232, and associated mechanism.

The oscillating cam 368 has its cam surface engaged by a follower roller 384 journaled intermediate the ends of a lever 386 which has its lower end pivoted at 388 in a bracket 390. The upper end of the lever 386 is pivoted at 392 to an angularly shaped link 394 which in turn is connected to the outer end of the lever 266 by a pivotal connection 396. The follower roller 384 is held against the cam surface by a tension spring 398 extending between the point 400 on the lever and a bracket 402 on the bottom frame 30. As the oscillating cam 368 rotates it pivots the lever 386 back and forth to oscillate its upper end which is connected to the arm 266 thereby oscillating the sleeve 244, the suction head 232 and associated mechanism. A combination of vertical and oscillating movement is imparted to the sleeve 242 and the suction head 232 for purposes which will appear hereinafter.

Each of the cams 366 and 368 is designed to be adjustable. Each cam is mounted on a hub 404 provided with arcuate slots 406 through which bolts 408 extend to lock the cam to the hub. In this way a nicety of adjustment can be made so that the sleeve 242 and associated elements can be raised, lowered and oscillated in proper timed relationship to the movement of a carton blank 10 through the machine.

The trailing end of the tape 18 is severed from the box carton blank after the tape has been adhered thereto, by a constantly rotating disc knife 410 mounted on a shaft 412 journaled in partitions 414 and 416 in the suction head 232 (Fig. 7). The knife blade 410 is driven by a motor 418 mounted upon a bracket 420 carried on the sleeve 242. The motor 418 drives a pulley 422 over which extends a belt 424 which drives a smaller pulley 426 mounted on the shaft 412 between the bearing carrying walls 414 and 416. It is to be noted that the knife blade 410 is driven at all times that the machine is in operation although if preferred it may be started and stopped so only to be driven when actually severing the tape 18.

The lower face of the suction head 232 has a longitudinally extending foot 428 adapted to ride on the upper surface of the carton after the lifting and oscillating cams have moved the suction head to a position above the carton blank as will be hereinafter explained. This foot is, as seen in Fig. 7, located alongside the row of openings 236 in the suction head and does not in any way interfere with the tape 18 after it has been applied to the carton, nor with that portion of the tape which is severed from the carton. The foot 428 also provides a guard against accidental cutting of the operator's hand by the knife 410. The head 232 is also provided with a shield 430 which serves the same purpose.

Figure 1:
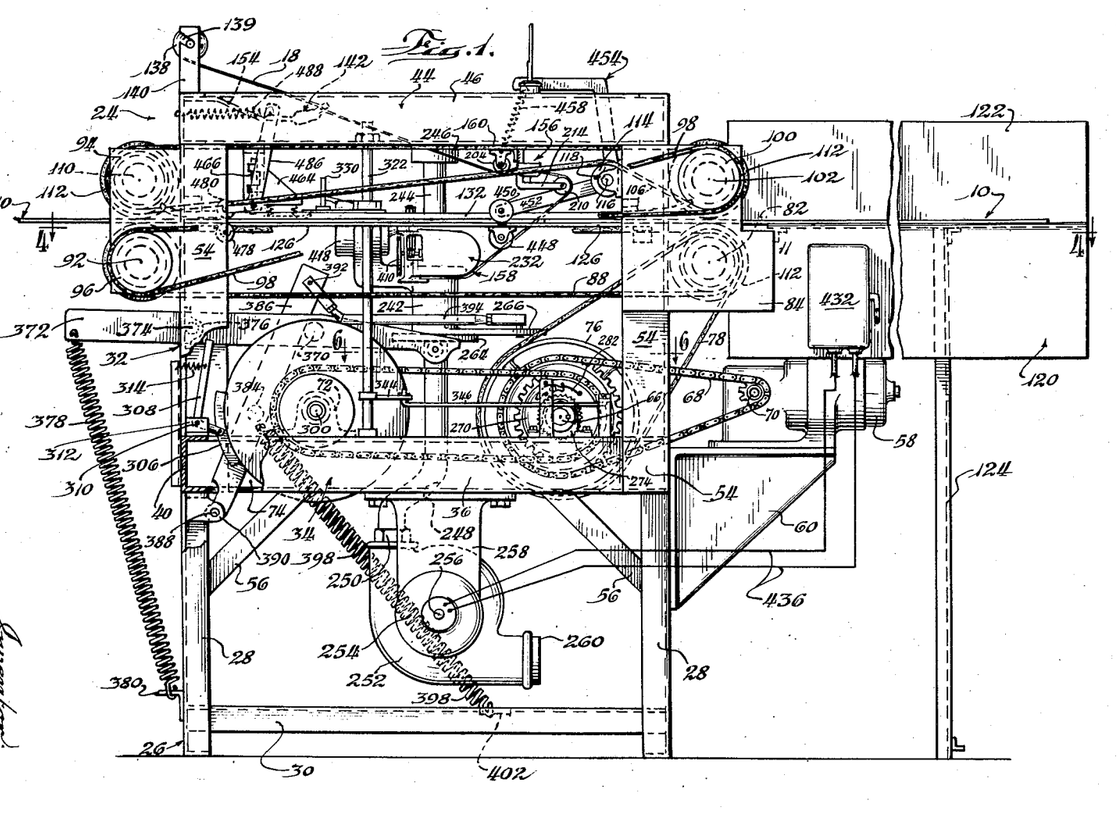
Fig. 1 is a front elevation of a machine illustrative of this invention, for applying a tear string, tape or the like to a box carton blank.

The operation of the machine is controlled from a single controller 432 of conventional construction having a circuit 434 connecting it to a source of electric power, a circuit 436 connecting the controller to the blower motor 254, a circuit 438 connecting the controller to the main operating motor 58, and a circuit 440 leading to the knife driving motor 413 (Figs. 1 and 4).

The machine is readied for operation by manually threading the tape through the tension regulator 142 and adhesive applicator 156 and by drawing a portion of that tape to which adhesive has been applied down to the suction head 232. For this purpose the table 126 is slotted at 442 and is provided with a generally rectangular opening 444 through which the suction head 232 and associated mechanism passes. At either side of the slot 442 a pair of pressure rollers 446 are mounted on depending brackets 448. The rollers 446 are contacted by a downwardly biased pressure roller 450 journaled on the outer end of one leg 452 of a U-shaped lever 454 which is pivoted to the frame on the transverse shaft 116. The arm 452 and roller 450 are urged downwardly by a spring 458 extending from the end of arm 460 to the transverse frame member 160 (Fig. 2).

Figure 2:
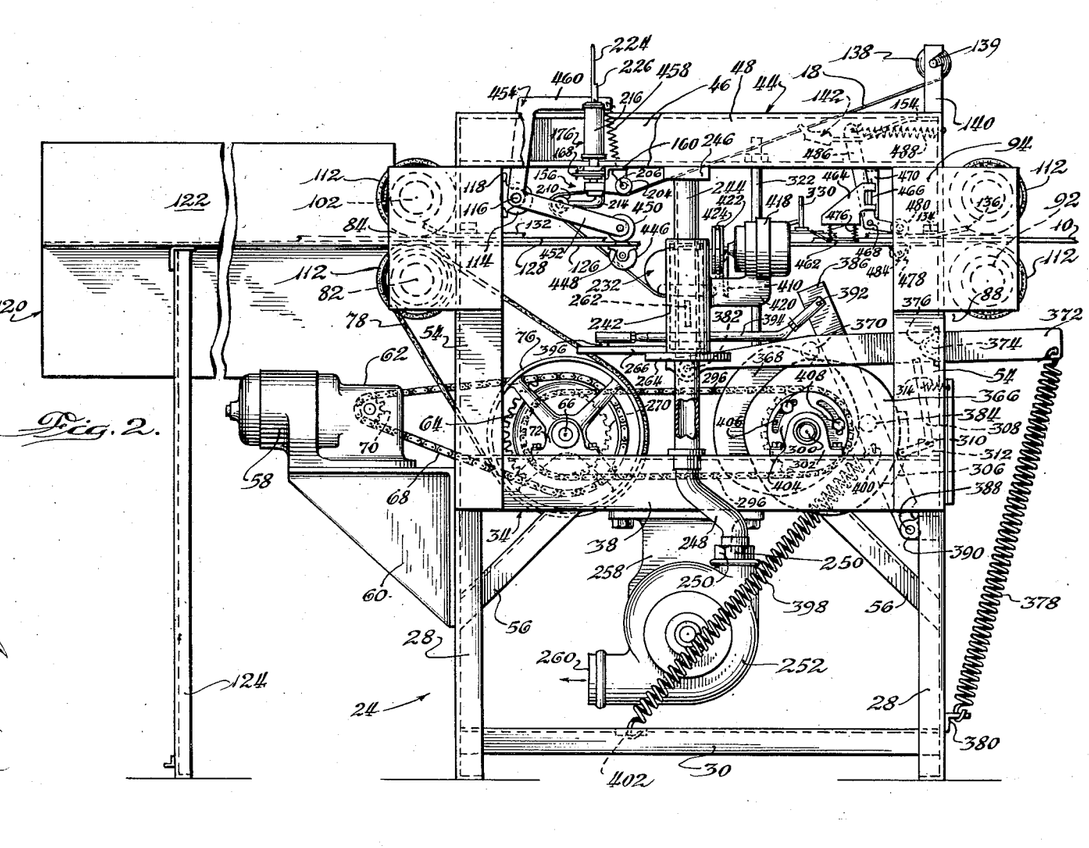
Fig. 2 is a rear elevation.

After the tape 18 has been applied to the surface of the box carton blank 10, it passes beneath a pressure foot 462 carried on a bracket 464 mounted on an upstanding arm 466 secured to a cross bar 468 which in turn is carried in brackets 470 depending from the frame members 46 and 48. The foot 462 depends from a pair of pins 472 slidable in spaced guides 474 on the bracket 464. A pair of springs 476 urge the pressure foot downwardly against the tape 18 on the blank. Additional pressure is applied to the tape by a pair of pressure rollers 478 and 480. The roller 478 projects through a slot 482 in the table 126 and is journaled in a depending bracket 484. The pressure roller 480 is carried at one end of a bellcrank 486 which is pivoted on the transverse bar 468. The bellcrank is biased in clockwise direction (Fig. 7) by a spring 488 connecting the upwardly extending arm thereof with an adjustment screw 490 threaded through the transverse frame member 50. In this way the tension on the spring may be regulated to vary the pressure exerted by the roller 480 against the carton blank and the tape 18 as they pass between the rollers 478 and 480.

The operation of the machine is described with particular reference to Figs. 11 to 16 which show the position of the machine elements at various stages during the application of the tape 18 to the carton blank 10 and its subsequent severance from the source of supply. The machine is readied for operation by manually applying adhesive to the surface of the tape 18 by pulling it through the adhesive applicator 156 and passing it around the direction reversing roller 210, through the slot 442, between the pressure rollers 446, below the pressure roller 450 and beneath the suction head 232. When the suction blower 252 is operating sufficient suction will be developed at the head 232 and through the holes 236 to hold the tape on the head even though all of the holes 236 might not be covered by a portion of tape 18. This starting position is that shown in Fig. 7.

A carton blank 10 is fed between the inlet rollers 112 and passed forwardly on the table 126 until it contacts the gummed or tacky side of tape 18 just ahead of the roller 450 as seen in Fig. 7. The advancing carton blank carries the tape 18 towards the roller 450 which pinches the tape against the carton blank and presses the adhesive coated side thereof firmly against the blank. If the machine has been properly adjusted for the carton blank size, the tape 18 will lie in the score line between the top flaps 14 and the side wall forming portions 12. As the carton 10 advances to meet the roller 450, it pulls a portion of the coated tape end 18 from the suction head 232 by sliding it along the bottom 235 thereof, the suction in the head not being sufficiently great to prevent this. This step in the application of the tape 18 to the carton blank is shown most clearly in Fig. 11.

Figure 12:
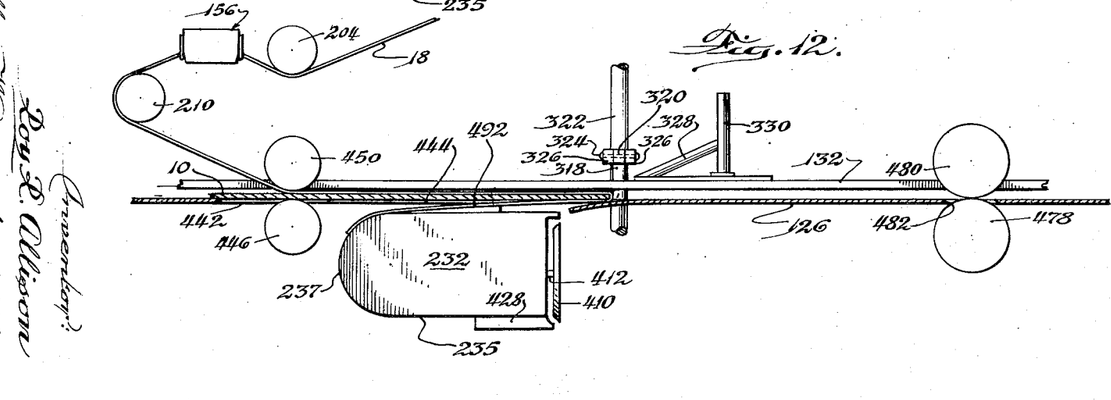

As the carton blank 10 continues through the machine tape is applied to the upper (or inner) surface thereof. Tape is drawn from the supply spool 138 through the tension regulator 142, the glue applicator 156 and beneath the pressure roller 450. At the same time the end of the tape 18 which was held by the suction head 232 is applied to the lower (or outer) surface of the blank 10 by the upper portion of the head which is shaped at 492 to provide a surface very close to the lower face of the carton blank 10. By the time the leading edge of the carton blank has crossed the opening 444 in the table and approaches the foot 318 of the dog clutch trip mechanism, substantially all of the tape will have been removed from the suction head 232. This condition is shown in Fig. 12.

Figure 13:
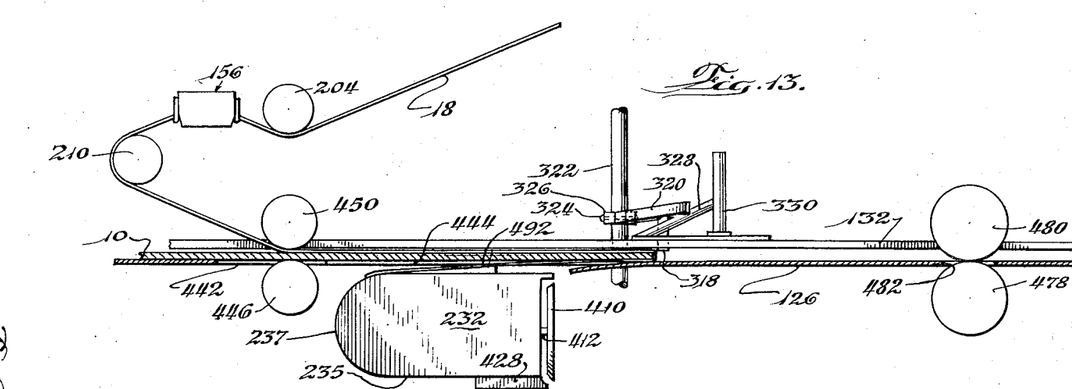
Figure 14:
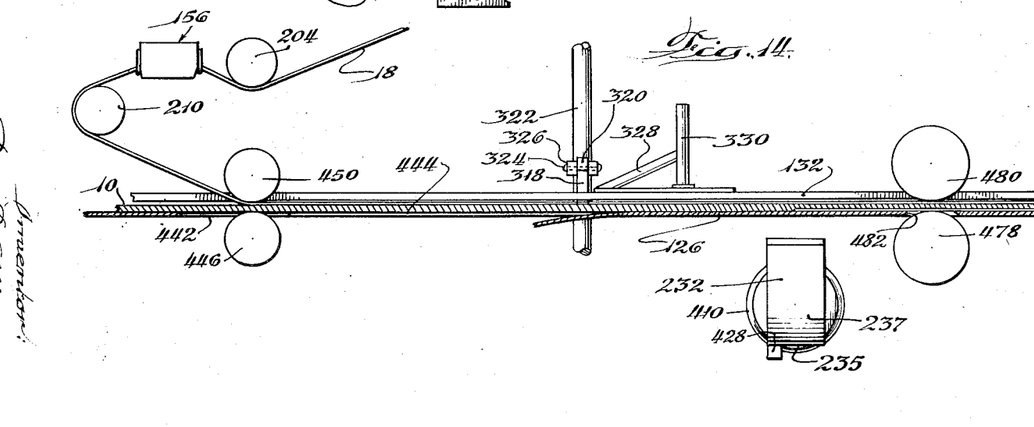

Continued movement of the carton blank through the machine causes the leading edge of the blank to engage the foot 318 and to move the transverse lever 320 in a counterclockwise direction (Fig. 3) or to the right as seen in Fig. 13. At this time the end of the tape 18 has come free of the suction holes 236 in the suction head 232. The movement of the rod 320 to the right (Fig. 13) actuates the linkage 316 to cause engagement of the dog clutch 272 thereby establishing the drive between the counter shafts 66 and 300 to drive the lifting and oscillating cams 366 and 368. The lifting cam first drops the sleeve 242 and associated mechanism a slight distance sufficient to bring the suction head 232 about to the level shown in Fig. 14 and the oscillating cam swings the mechanism clockwise (Fig. 3) through an arc of 90°, namely from the full line position to the dotted line position, thereby moving the head out from below the table 126. The carton blank during this time continues to advance, and that portion of the tape 18 which was carried by the suction head 232 is now secured to the lower (or outer) surface of the blank and additional tape is laid in the score line in the upper (or inner) face of the blank 10 and pressed therein by the roller 450. It will be noted from Fig. 14 that the box carton blank is passing between the pressure rollers 480 and 478 which serve to complete the securing of the tape to the box carton blank. It will also be noted that the spring 362 has restored the linkage 316 to clutch disengaging position and that the foot 318 rides tightly on the upper face of the carton blank.

Figure 15:
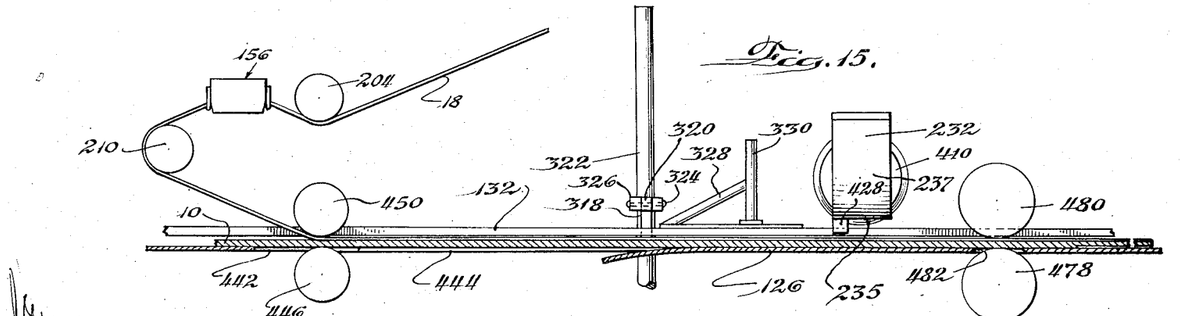
Figure 16:
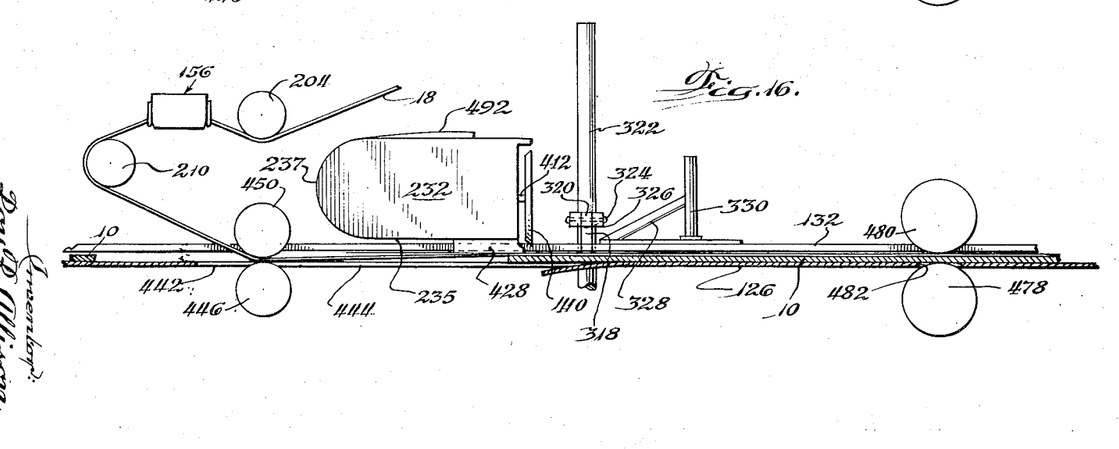

While the suction head 232 and associated mechanism are positioned to the rear or outside of the machine and beyond the table 126, the lifting cam 366 raises them to the upper position shown in Fig. 15, and in that upper position the suction head is slightly above the table 126 and side guide rails carried thereby. Before the end of the carton blank is reached the oscillating cam 368 swings the suction head back to its original angular position, but it is still held in the raised position by the cam 366. After it is returned to its original angular position the suction head 232 is lowered onto the upper surface of the carton blank 10 as the cam 366 falls away from the follower roller 370. It is to be observed from Fig. 16 that the foot 428 rides on the carton blank and the blank supports the suction head over the opening 444 in the table 126. As the trailing end of the carton blank passes below the suction head 232 the latter, no longer supported by the cam 366, drops downwardly, during which movement the cutting edge of the rotating knife 410 severs the tape 18 at the very edge of the carton blank. Since the carton blanks are spaced from each other as they are fed to the machine at least a distance slightly greater than the length of the suction head, a free portion of coated tape is located immediately below the suction head when the carton is moving out from therebeneath. As the head drops downwardly to the position shown in Fig. 11, this free end, now severed from the tape applied to the previous carton, is caught by the suction openings 236 and thereby held with sufficient force to draw additional tape from the supply spool and through the glue applicator 156 to ready the machine for the succeeding operational cycle. See Figs. 11 and 7.

The tear string or tape applying machine of this invention is completely automatic in its operation, and it applies the tear tape to the carton blank on the inner surface thereof completely along one of the score lines therein and to the outer face of the carton for a distance which is readily adjustable but which preferably is about six inches to provide a hand grip enabling a person to open the carton.

It is apparent from the foregoing description that all of the objectives have been attained.

While preferred embodiments of the machine and method constituting this invention have been shown and described, it will be apparent that numerous variations and modifications thereof may be made without departing from the underlying principles of the invention. For example, a species of the present invention is described and claimed in the copending application of Walter S. Aldrich and Robert H. Hanes which was filed February 18, 1952 as Serial No. 272,086.

It is, therefore, desired by the following claims to include within the scope of the invention all such variations and modifications by which substantially the results of this invention may be obtained through the use of substantially the same or equivalent means or steps.

What is claimed as new and desire to be secured by United States Letters Patent is:

1. A machine for applying a tear tape or the like to a box carton blank comprising in combination a source of tape supply, means for movably supporting a carton blank, means for moving the carton blank across said supporting means, means for continuously coating adhesive on one face of the moving tape, means for holding one end of the tape so that a portion of it lies across the path of movement of the carton blank and so that initially the tape will be applied to both sides of the blank at one end thereof and to one side for the remaining length thereof, and means for severing the tape supply from the tape adhered to the carton blank at the end of the application so that the free end thereof is engaged and held by said holding means.

2. A machine for applying a tear tape or the like to a box carton blank comprising in combination a source of tape supply, a table for movably supporting a carton blank, power driven rollers for moving the carton blank across said table, an applicator for continuously coating adhesive on one face of the tape, suction means for holding one end of the tape so that a portion of it lies across the path of movement of the carton blank and that initially the coated tape will be adhered to both sides of the blank at one end thereof and to one side of the blank for the remaining length thereof, and means for severing the tape supply from the tape adhered to the carton blank at the end of the application so that the free end thereof is held by said suction means.

3. A machine for applying a tear tape or the like to a box carton blank comprising in combination a source of tape supply, a table for movably supporting a carton blank, power means for moving the carton blank across said table, means for continuously coating adhesive on one face of the tape, a suction device for releasably holding one end of the tape so that a portion of it lies across the path of movement of the carton blank and that initially the coated tape will be adhered to both sides of the blank at one end thereof and to one side of the blank for the remaining length thereof, means carried by said suction device for severing the tape supply from the tape adhered to the carton blank, and means for moving said suction device so that said severing means and said suction device are properly positioned to sever the tape and to engage and hold the free end of the tape, respectively.

4. A machine for applying a tear tape or the like to a box carton blank comprising in combination a table for movably supporting a carton blank, power means for moving the carton blank across said table, means for storing a quantity of tape so that tape may be withdrawn therefrom, means for continuously coating adhesive on one face of the tape as it is withdrawn from said storage means, a suction device for releasably holding one end of the coated tape so that a portion of it lies across the path of movement of the carton blank and that initially the coated tape will be adhered to both sides of the blank at one end thereof and to one side of the blank for the remaining length thereof, a rotating disc cutter for severing the tape supply from the tape adhered to the carton blank, means including cam means for moving said cutter into and out of severing position and for moving said suction device so as to engage and releasably hold the free end of the tape after it has been severed, and means actuated by the movement of the carton blank for initiating operation of said last named means.

5. A machine for applying a tear tape or the like to a box carton blank comprising in combination a table for movably supporting a carton blank, power means for moving the carton blank across said table, means for storing a quantity of tape so that tape may be withdrawn therefrom under tension, means for continuously coating adhesive on one face of the tape as it is withdrawn from said storage means, means interposed between said storage means and said adhesive applying means for regulating the tape tension, a suction device for releasably holding one end of the coated tape so that a portion of it lies across the path of movement of the carton blank and that initially the coated tape will be adhered to both sides of the blank at one end thereof and the moving blank will withdraw additional tape from said storage means and tape will be adhered to one side of the blank for the remaining length thereof, a rotating disc cutter for severing the tape supply from the tape adhered to the carton blank, means including a clutch and cam means for moving said cutter into and out of severing position and for moving said suction device so as to engage and releasably hold the free end of the tape after it has been severed, and trip means actuated by the movement of the carton blank for engaging said clutch, said clutch being automatically disengaged at the end of the cam cycle.

6. In a machine for applying a tear tape or the like to a box carton blank, the combination of a source of tape supply, a vacuum source, a movable suction head connected to said vacuum source and having a plurality of openings therein so that the end of the tape remote from said supply source may be held at said openings by the vacuum in said suction head, severing means for cutting the tape secured to the carton blank from said source of tape supply, and means for moving said severing means into and out of cutting position and for moving said suction head into such position that the remote end of the tape will be caught and held by said suction means.

7. In a machine for applying a tear tape or the like to a box carton blank, the combination of a source of tape supply, a vacuum source, a movable suction head connected to said vacuum source and having a plurality of aligned openings therein so that the end of the tape remote from said supply source may be releasably held at said openings by the vacuum in said suction head, a rotatable disc cutter mounted on said suction head and adapted to cut the tape secured to the carton blank from said source of tape supply, and means for moving said suction head so that said cutter is moved into and out of cutting position and at the end of a cutting operation said suction head will engage and hold the remote end of the tape.

8. The method of continuously applying a tear tape or the like to box carton blanks comprising holding the free end of a tape having its opposite end connected to a source of tape supply so that at least that portion of the tape adjacent the free end is under at least a slight tension, coating one face of the tape in that portion of the tape under tension and adjacent the free end, feeding a carton blank and directing it so as to contact the coated face of the tape, moving the carton blank so that the portion of the tape between the contact point and said free end is pulled from held position and adhered to one side of the blank and the next adjacent portion of the tape is simultaneously adhered to the opposite blank face, continuing the blank movement so that the tape is adhered to said last named blank face throughout the length thereof, and severing that portion of the tape adhered to the carton from the source of tape supply and simultaneously therewith holding the severed end of the tape for a subsequent cycle.

9. The method of continuously applying a tear tape or the like to box carton blanks comprising holding the free end of a tape having its opposite end connected to a source of tape supply so that at least that portion of the tape adjacent the free end is under at least a slight tension, coating one face of the tape in that portion of the tape under tension and adjacent the free end, feeding a carton blank and directing it so as to contact the coated face of the tape, moving the carton blank so that the portion of the tape between the contact point and said free end is pulled from held position and adhered to one side of the blank and the next adjacent portion of the tape is simultaneously adhered to the opposite blank face, continuing the blank movement so that the tape is adhered to said last named blank face throughout the length thereof, pressing the tape firmly to said last named blank face at the point of adherence, and severing that portion of the tape adhered to the carton from the source of tape supply and simultaneously therewith holding the severed end of the tape portion for a subsequent cycle.

10. The method of continuously applying a tear tape or the like to box carton blanks comprising holding the free end of a tape having its opposite end connected to a source of tape supply so that at least that portion of the tape adjacent the free end is under at least a slight tension, coating one face of the tape in that portion of the tape under tension and adjacent the free end, feeding a carton blank and directing it so as to contact the coated face of the tape, moving the carton blank so that the portion of the tape between the contact point and said free end is pulled from held position and adhered to one side of the blank and the next adjacent portion of the tape is simultaneously adhered to the opposite blank face, continuing the blank movement so that the tape is adhered to said last named blank face throughout the length thereof, the movement of the tape being caused by movement of the blank so that tape is withdrawn from the supply source and coated with adhesive, and severing that portion of the tape adhered to the carton from the source of tape supply and simultaneously therewith holding the severed end of the tape portion for a subsequent cycle.

11. The method of continuously applying a tear tape to box carton blanks comprising feeding carton blanks one at a time, holding an adhesive coated tape by one end across the path of movement of the blanks so that the leading edge of a blank contacts the coated side of the tape, releasing said one end of the tape and adhering it to one face of said blank, continuing the blank movement so that tape is adhered to the other face of the blank along the entire length thereof, the movement of the blank with the simultaneous adhering of tape to said other blank face withdrawing tape from a source of tape supply, and coating said one side of the tape between the point of tape supply and the point at which the blank contacts the tape.

12. The method of continuously applying a tear tape to box carton blanks comprising feeding carton blanks one at a time, holding an adhesive coated tape by one end across the path of movement of the blanks so that the leading edge of a blank contacts the coated side of the tape, releasing said one end of the tape and adhering it to one face of said blank, continuing the blank movement so that tape is adhered to the other face of the blank along the entire length thereof, the movement of the blank with the simultaneous adhering of tape to said other blank face withdrawing tape from a source of tape supply, coating said one side of the tape between the point of tape supply and the point at which the blank contacts the tape, severing that portion of the tape adhered to the blank from the source of tape supply, and substantially simultaneously holding and moving the severed end of the tape so that the tape lies across the path of blank movement.

13. The method of applying a tear strip to a box carton blank comprising feeding the carton blank in an endwise direction, supplying an adhesive coated tape from a supply source, contacting the leading edge of the moving blank against the adhesive coated side of the tape at a point adjacent a free end thereof, simultaneously pressing the free end of the tape to and along a short distance on the outside face of the moving blank and the next adjacent portions of the tape to the inside face of the blank until a tear strip is adhered to the inside face of the blank along its entire length, and cutting the adhered tape from the supply source at the trailing edge of the moving blank and simultaneously holding the severed free end thereof for application to another carton blank.

14. The method of continuously applying a tear tape or the like to box carton blanks comprising holding the free end portion of an adhesively coated tape having its opposite end connected to a source of tape supply so that at least that portion of the tape adjacent the free end portion is under at least a slight tension, feeding a carton blank and directing it so as to contact the coated face of the tape at a point adjacent said free end portion thereof, moving the carton blank so that the portion of the tape between the contact point and the free end of the tape is pulled from held position and adhered to one face of the blank and the next adjacent portion of the tape is simultaneously adhered to the opposite blank face, continuing the blank movement so that the tape is adhered to said last named blank face throughout the length thereof, and severing that portion of the tape adhered to the carton blank from the source of tape supply and simultaneously therewith holding the severed end of the tape for a subsequent cycle.

15. A machine for continuously applying a tear tape or the like to box carton blanks comprising means for holding the free end portion of an adhesively coated tape having its opposite end connected to a source of tape supply so that at least that portion of the tape adjacent the free end portion is under at least a slight tension, means for advancing a carton blank in a direction to contact the coated face of the tape at a point adjacent the free end portion and to pull the free end portion from held position and adhere it to one face of the blank and simultaneously to adhere the next adjacent portion of the tape to the opposite blank face and for continuing to advance the blank thereafter to adhere the tape to said opposite blank face throughout the length of said opposite blank face, means for severing that portion of the tape adhered to the carton blank from the source of tape supply, and means operative simultaneously with the severing action for bringing the severed end of the tape into said held position in readiness for a subsequent cycle.

16. A machine for applying a tear tape or the like to a box carton blank comprising in combination a source of adhesively coated tape supply, means for movably supporting a carton blank, means for moving the carton blank across said supporting means, means for holding one end of the tape so that a portion of it lies across the path of movement of the carton blank and so that initially the tape will be applied to both sides of the blank at one end thereof and to one side for the remaining length thereof, and means for severing the tape supply from the tape adhered to the carton blank at the end of the application so that the free end thereof is engaged and held by said holding means.

References Cited in the file of this patent

UNITED STATES PATENTS

| | | |
|---|---|---|
| 1,167,633 | Dennis | Jan. 11, 1916 |
| 1,609,218 | Storck | Nov. 30, 1926 |
| 1,724,224 | Schroeder | Aug. 13, 1929 |
| 1,861,144 | Schmiedel | May 31, 1932 |
| 2,109,527 | Fenton | Mar. 1, 1938 |
| 2,165,289 | Nulmoe | July 11, 1939 |
| 2,203,910 | Issartel et al. | June 11, 1940 |
| 2,245,827 | Salfisberg | June 17, 1941 |
| 2,276,745 | Smith | Mar. 17, 1942 |
| 2,324,745 | Weber | July 20, 1943 |
| 2,350,244 | Malhiot | May 30, 1944 |
| 2,368,520 | Burckhardt et al. | Jan. 30, 1945 |
| 2,375,493 | Randall | May 8, 1945 |
| 2,464,849 | Coward | Mar. 22, 1949 |
| 2,564,901 | Hess | Aug. 21, 1951 |
| 2,579,842 | Lundburg | Dec. 25, 1951 |
| 2,625,775 | Tamarin et al. | Jan. 20, 1953 |